May 6, 1924.
W. C. WALKER
SHIM
Filed Feb. 21, 1923
1,493,089
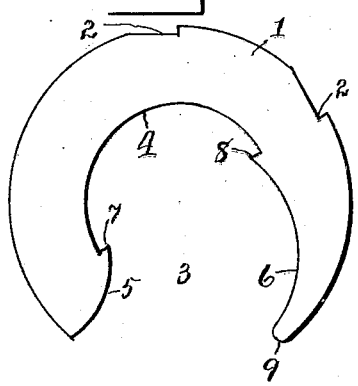
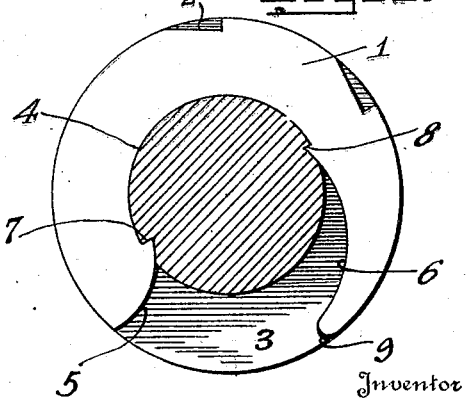
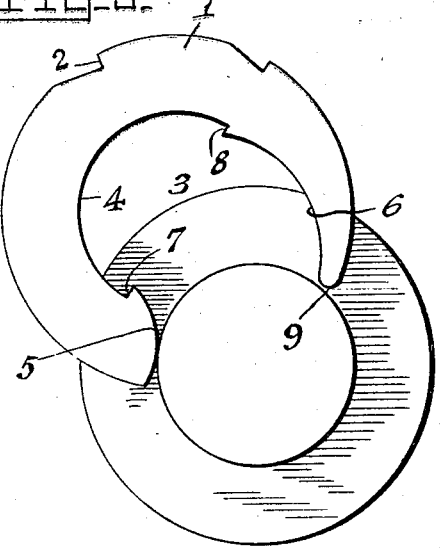
Inventor
Walter C. Walker.

Patented May 6, 1924.

1,493,089

UNITED STATES PATENT OFFICE.

WALTER C. WALKER, OF WASHINGTON, DISTRICT OF COLUMBIA.

SHIM.

Application filed February 21, 1923. Serial No. 620,459.

*To all whom it may concern:*

Be it known that I, WALTER C. WALKER, a citizen of the United States, residing at Washington, in the District of Columbia, have invented a new and useful Improvement in Shims, of which the following is a specification.

This invention relates to shims especially adapted to be used for tightening automobile wheels and it consists in the novel features hereinafter described and claimed.

An object of the invention is to provide a shim in the form of a relatively thin metallic disk adapted to be inserted between the wheel rim and the shoulder of a spoke and receiving the tenon of the spoke whereby the wheel structure is tightened and relative movement of the parts is prevented and squeak or noise is eliminated.

A further object of the invention is to provide a shim having characteristic features adapted to firmly engage the parts of the wheel structure with which they come in contact whereby the shim is securely held in position after it has been inserted between the wheel rim and the shoulder of the spoke.

A still further object of the invention is to provide a shim which will not cut or tear the fibre or grain of the tenon of the spoke while being applied.

Other objects and advantages will become manifest as the description of the invention progresses.

In the accompanying drawing—

Figure 1 is a plan view of the shim.

Figure 2 is an edge view of the same.

Figure 3 is an end view of a spoke showing the shim about to be applied to the shoulder and tennon thereof.

Figure 4 is a similar view showing the shim applied and illustrating the tenon of the spoke in section and showing the shim in engagement therewith.

As illustrated in the accompanying drawing the shim comprises a circular or disk shaped body 1 of relatively thin metal. The said body is provided at its outer edge with notches 2 adapted to receive the end of a tool (not shown) when the shim is being inserted in position between a wheel rim and the shoulder portion of a spoke.

A throat 3 leads into the interior of the body 1 from the outer edge thereof and the inner end of the said throat is provided with an arcuate edge wall 4 which is of the same radius and diameter as the radius and diameter of the tenon of the spoke to which the shim is applied. The throat 3 is provided with longitudinally curved edges 5 and 6 which are spaced from each other sufficiently to permit the tenon of the spoke to pass between them when the shim is being applied. The edge 5 is shorter than the edge 6 and of a deeper arc of curvature. The inner ends of the edges 5 and 6 terminate in prongs 7 and 8 respectively which are spaced from each other for a distance less than the diameter of the edge 4. The end of the body at that side of the throat at which the longer edge 6 is located is rounded as at 9.

The shim is applied by forcing the rim of the wheel as far as possible away from the shoulder of the spoke. The outer ends of the edges 5 and 6 are then inserted between the rim and the shoulder so that the tenon of the spoke is partially received between the edges 5 and 6. The shim is then driven between the rim and the shoulder and the tenon of the spoke moves inwardly along the throat 3. At the same time the edge 5 encounters the side of the tenon and the frictional contact causes the shim to turn along the edge 5 as the shim is forced between the rim and the shoulder. When the tenon of the spoke enters the inner end of the throat which is bounded by the arcuate edge 4 the shim will cease to turn as it is being driven in place. At this time the pointed end of a tool is placed in one of the notches 2 and the tool is held at a tangent to the shim body. The said tool is then struck with a hammer so that the edge 4 is driven up close against the side of the tenon of the spoke and the prongs 7 and 8 are embedded in the grain of the tenon of the spoke. The lifting strain is then removed from the wheel rim whereby the said rim may contract and the shim is firmly bound between the wheel rim and the shoulder of the spoke and the prongs 7 and 8 engaging in the tenon of the spoke will prevent the shim from turning. Hence when once applied it will be impossible for the shim to work out from between the wheel rim and the shoulder of the spoke.

Having described the invention what is claimed is—

1. A shim comprising a flat disk body having a longitudinally curved throat leading in from the outer edge thereof and lying in the plane of the body.

2. A shim comprising a disk body having a longitudinally curved throat leading in from the outer edge thereof, the said body being provided at the opposite side edges of the throat with inwardly disposed prongs which extend into the throat.

In testimony whereof I affix my signature.

WALTER C. WALKER.